United States Patent [19]

Sieverding

[11] Patent Number: 4,857,401

[45] Date of Patent: Aug. 15, 1989

[54] DECORATIVE FOILS AND DECALS

[76] Inventor: David L. Sieverding, 7260 Mount Sherman Rd., Longmont, Colo. 80501

[21] Appl. No.: 61,962

[22] Filed: Jun. 15, 1987

[51] Int. Cl.$^4$ ............................................... B32B 15/08
[52] U.S. Cl. ...................................... 428/336; 428/457; 428/913
[58] Field of Search ................... 428/461, 13, 61, 457, 428/913, 914, 336

[56] References Cited

U.S. PATENT DOCUMENTS

| | | | |
|---|---|---|---|
| 3,082,135 | 3/1963 | Lane | 428/914 X |
| 3,235,395 | 2/1966 | Scharf | 428/914 X |
| 3,382,136 | 5/1968 | Bugel | 428/461 |
| 3,839,129 | 10/1974 | Neumann | 428/61 |
| 4,012,552 | 3/1977 | Watts | 428/914 X |
| 4,125,655 | 11/1978 | Kanzelberger | 428/13 X |
| 4,275,116 | 6/1981 | Krätschmer | 428/914 X |
| 4,556,588 | 12/1985 | Rockwood | 428/13 |

Primary Examiner—Thomas J. Herbert
Attorney, Agent, or Firm—George A. Skoler

[57] ABSTRACT

A heat shapeable and deformable composite comprising (i) a thermoplastic layer of a plastic which softens to a flowable condition at temperatures in the range of above about 20° C. to about 110° C. and which is solid and non-flowable at a temperature of about 20° C., adhesively bonded to (ii) a foil layer having a thickness less than that of (i); a process of making the heat shapeable and deformable composite which comprises heat compressing (i) to (ii); and handcrafting the composite by subjecting a composite of (i) adhesively bonded to (ii) to a temperature above the softening temperature of the thermoplastic layer and softening the thermoplastic layer, removing the heated composite from the application of heat such that its temperature is caused to decrease, shaping the composite while the thermoplastic layer is still soft, and cooling the composite to a temperature below the thermoplastic's softening temperature.

12 Claims, No Drawings

DECORATIVE FOILS AND DECALS

This application is related to copending application Ser. No. 061,963 (attorney's docket no. FPC1001), commonly assigned and filed on even date herewith.

BRIEF SUMMARY OF THE INVENTION

This invention relates to a composite of a decorative layer adhesively bonded to a layer of a high molecular weight plastic having a low softening temperature. The invention also relates to process for making shaped articles by heating a composite of a decorative layer adhesively bonded to a layer of a high molecular weight plastic having a low softening temperature at a temperature of about 60° C. to about 110° C. sufficient to soften the composite and render it shapeable. The invention also relates to a process of making the aforementioned composite by the compression of a molten or softened surface of high molecular weight polycaprolactone to a decorative layer and conforming the resulting composite while the high molecular weight polycaprolactone is softened to the desired shape.

DETAILED DESCRIPTION OF THE INVENTION

Discussion of the Prior Art

Lane, U.S. Pat. No. 3,082,135, patented Mar. 19, 1963, effects a foil transfer by affixing the foil to less than the full surface of a protective surface and an adhesive is provided on at least a portion of the remaining surface of the protective surface.

Scharf, U.S. Pat. No. 3,235,395, patented Feb. 15, 1966, is typical of the state of the art of transfer coating metallic films to a desired substrate. The patent describes the deposition of a metal film onto a clear transparent film followed by a coating of an adhesive to the metal film. The transparent film is affixed to a carrier web which allows the laminated composite to be bonded onto the desired substrate. When the carrier web is removed, the exposed transparent film acts as a protective layer for the metal film. Adhesive and release coatings are depicted by the patentee.

Alexander, U.S. Pat. No. 3,654,016, patented Apr. 4, 1972, describes a method and apparatus for adhering foil to a substrate and safely removing the carrier from the foil without damage. The patentee shows at col. 3, lines 38-55, that the use of silicone rubber covered rollers are conventional in effecting the "heat-ironing" of foil to a surface. It is assumed that the foil film used by the patentee employed an adhesive interface between the foil and the surface to which it is bonded.

Neumann, U.S. Pat. No. 3,839,129, patented Oct. 1, 1974, appears to utilize an equivalent to the Scharf, supra, process of employing an outer plastic layer to protect the foil layer in the molded structure except that the process is effected by injection molding.

Watts, U.S. Pat. No. 4,012,552, patented Mar. 15, 1977, is a variation on the Scharf, supra, technology except that the last adhesive layer used to bond the foil to the surface is configured to a particular design.

Kanzelberger, U.S. Pat. No. 4,125,655, patent Nov. 14, 1978, and U.S. Pat. No. 4,520,064, patented May 28, 1985, adhesively bond a portion of a hot stamping foil to a plastic surface and provide a backing sheet in adhesion to the foil which contains a release coating.

Kraetschmer, U.S. Pat. No. 4,275,116, patented June 23, 1981, characterizes a number of metallized hot stamping foils comprising, in one case, a thermoadhesive layer, a metal layer of vacuum evaporated metal or fine powder metals as of aluminum, chromium, copper, nickel, and conventional alloys used for hot-stamping foil, a protective lacquer layer for the metal layer, a release layer between the protective layer and the carrier. In a second case, the patentees describe a laminate comprising in sequence, a thermoadhesive layer, a first lacquer layer, a metal layer, a second lacquer layer, a release layer and a carrier.

Rockwood, U.S. Pat. No. 4,556,588, patented Dec. 3, 1985, speaks of the use of "hand deformable, molded plastic material" and characterizes them as "a flexible plastic which . . . can conform to a curved surface." A foil member may be adhesively bonded to the plastic material. Flexibility is sought so that the plastic can be affixed to a curved surface "using an attachment means provided on the back of the emblem to maintain that shape once applied."

The above prior art fails to characterize the manufacture of decorative foil composites that can be made by the hobbyist using conventional household tools and appliances. It fails to characterize a decorative foil composite that can be easily shaped to make sculpted structures, appliances, jewelry, and the like, by hand using only hot water or a hot air hair dryer, and the like, and, optionally, common household tools. The prior art fails to recognize a synergy between the attributes of a decorative foil laminate and the type of plastic material from which it is made.

The term "foil," as used herein and in the claims, means a thin piece of material which may be metal or metallic appearing, such as pearlescent or metallic coatings, which is adhered to another surface to add color or brilliance.

Hobbyists have had available to them modeling materials which are softened in hot water, can be shaped when softened and upon cooling, solidifies to a stiff material that retains the shape. One such material is high molecular weight poly(epsilon-caprolactone). It has been determined to develop certain deficiencies for this application when it is repeatedly worked in the melt. The correction of such deficiencies is the subject matter of the aforementioned copending application.

Poly(epsilon-caprolactones)[1] is a polymer formed by the addition reaction of epsilon-caprolactone with a starter alcohol. See *J. V. Koleske*, Chapter 22 of Paul & Neuman, Polymer Blends, vol. 2, Pages 369-389, published by Academic Press, Inc., 1978. It is generally available from Union Carbide Corporation, Danbury, CT 06817, in 3 molecular weight grades: PCL-700, a tough, extensible polymer with a molecular weight (ave. $M_w$) of about 40,000; PCL-300 with a molecular weight (ave. $M_n$) of about 10,000; and PCL-150 with a molecular weight (ave. $M_n$) of about 5,000. According to Koleske, at page 370, "Low molecular weight (ave. $M_n$ about 300-3000) oligomers or polyols are also commercially available. However, these polyols have utility as intermediates for polyurethanes and are not used as blending materials."

[1]. This term is hereinafter called "polycaprolactones" or "polycaprolactone", as the case may be The polycaprolactones with which this invention is concerned are those having a high molecular weight (ave. $M_w$) corresponding to a reduced viscosity at a concentration of 0.2 gm/dl of benzene, determined at 30° C., of between about 0.5 and 10, preferably between about 1.5 and 5. In the most preferred embodiment, the high molecular weight polycaprolactone has a reduced viscosity of between about 3.0 and 4.0. These high molecular weight polycaprolactones are thermoformable plastic materials which exhibit crystallinity on cooling from the melt. They have a crystalline melting temperature ($T_m$) of about 60° C.

PCL-700 is chemically characterized by the following formula:

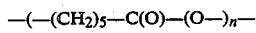

wherein n has a value between about 100 and 3000. Relevant physical properties of high molecular weight PCL-700 are as follows:

| | |
|---|---|
| 1% Secant Modulus, psi | 50,000 |
| Yield Stress, psi | 1,600 |
| Tensile Strength, psi (based on initial cross sectional area) | 3–4,000 |
| % Elongation | 500 to 1,000 |
| Melting Point, °C. ($T_m$) | 60 |
| Glass Transition Temperature, °C.($T_g$) | -60 |
| Density, g./cc. | |
| at 0° C. | 1.160 |
| at 20° C. | 1.149 |
| at 40° C. | 1.134 |
| Moisture Content, % | |
| at 50% Relative Humidity | 0.07 |
| at 100% Relative Humidity | 0.43 |
| Melt Flow, g./10 minutes[2] | |
| 80° C. | 1.9 |
| 100° C. | 3.7 |
| 120° C. | 6.5 |
| 150° C. | 13.4 |
| 170° C. | 20.2 |
| 190° C. | 30.6 |

[2]ASTM Method D 1238 at 43.25 psi., using PCL-700 dried at 40° C. under vacuum for 16 hours.

Because of its crystalline nature on cooling from the melt, high molecular weight polycaprolactone tends to shrink. In a molding application, this means that high molecular weight polycaprolactone will easily separate itself from the mold wall. Thus high molecular weight polycaprolactone as such, does not require a release agent to be formulated with it for molding applications. Polymers which contain caprolactone units are not necessarily the equivalent of high molecular weight polycaprolactone in this regard. For example, a polyurethane in which a low molecular weight polycaprolactone is used as a diol starter has substantially different physical and chemical properties from a high molecular weight polycaprolactone. Many of such polyurethanes are thermosets or elastomers. Such polymers frequently require a release agent to effect satisfactory mold release. Reference is made to Forrester et al., U.S. Pat. No. 3,382,202.

SUMMARY OF THE INVENTION

The invention embraces the following improvements on the art:

A. A heat shapeable and deformable composite comprising (i) a thermoplastic layer of a plastic which softens to a flowable condition at temperatures in the range of above about 20° C. to about 110° C. and which is solid and non-flowable at a temperature of about 20° C., adhesively bonded to (ii) a foil (as defined above) layer having a thickness less than that of (i);

B. A process of making a heat shapeable and deformable composite which comprises heat compressing (i) a thermoplastic layer of a plastic which softens to a flowable condition at temperatures in the range of above about 20° C. to about 110° C. and which is solid and non-flowable at a temperature of about 20° C., to (ii) a foil (as defined above) layer having a thickness less than that of (i) and C. Handcrafting a metal foil laminate composite which comprises subjecting a composite comprising (i) a thermoplastic layer of a plastic which softens to a flowable condition at temperatures in the range of above about 20° C. to about 110° C. and which is solid and non-flowable at a temperature of about 20° C., adhesively bonded to (ii) a foil (as defined above) layer having a thickness less than that of (i), to a temperature above the softening temperature of the thermoplastic layer and softening the thermoplastic layer, removing the heated composite from the application of heat such that its temperature is caused to decrease, shaping the composite while the thermoplastic layer is still soft, and cooling the composite to a temperature below the thermoplastic's softening temperature.

DETAILS OF THE INVENTION

The present invention fulfills a number of needs of hobbyists and small scale manufacturers of decorative items. It provides a decorative foil-plastic composite structure that can be softened by heating the plastic to a relatively low temperature, shaped at that temperature without adversely affecting the foil-plastic interface, and cooled to a lower temperature while maintained in the desired shape so that the plastic hardens to that shape. The resultant structure, including the foil, is permanently (so long as the object is kept below the plastic's softening temperature) configured to the desired shape. This allows one to make custom decorative foil objects with simple household tools and heating systems no more complex than a pot of water and/or a hair drier. Because the plastics that can be used in the invention have such excellent physical properties (note the physical properties of high molecular weight polycaprolactone above), the decorative foil-plastic composite fufils the use requirements of a vast array of applications. Because the plastic, while in a softened condition, can be made to bond to an enormous selection of surfaces ranging from stone to plastics to metals, the composite, without adversely affecting the interface of the foil-plastic, can be meticulously shaped to a surface made of such materials. The surface represents the mold in the shaping process. Needless to say, one can shape the composite to an extremely high level of extensibility and deform the foil-plastic interface; thus the shaping has to be reasonably controlled to obtain the benefits of the invention. Once the shaping process is completed to the satisfaction of the artisan, then the shaped composite while attached to the mold surface can be cooled to a temperature below the softening temperature of the plastic. When the plastic used in the composite is high molecular weight polycaprolactone, cooling causes it to crystallize and this process causes the composite to shrink away, and become released, from the mold surface as a self-supporting structure.

There are a number of plastics that can tenaciously bond to high molecular weight polycaprolactone. Illustrative of these are poly(vinyl chloride), Phenoxy (a poly(hydroxy ether) prepared from bisphenol A and epichlorohydrin), nitrocellulose, polyepichorohydrin, and chlorinated polyether (Penton TM). These plastics should not be used as mold surfaces unless a strong, essentially permanent bond to the mold is sought.

Other thermoplastics can be quite tacky to heat softened high molecular weight polycaprolactone. Softened, high molecular weight polycaprolactone applied with pressure to a surface of these plastics will generate permanent bonding to such surfaces unless care is taken in the molding process. The term "permanent bonding", as used herein, is intended to mean a degree of adhesion in which separation of the adhering bodies occasions cohesive failure. Such permanent bonding can be avoided (if permanent bonding is not desired) in most cases by cooling the high molecular weight polycaprolactone containing composite substantially below its $T_m$ of 60° C. Refrigeration of the molded part with the mold facilitates separation and minimizes permanent bonding. A desirable procedure for avoiding permanent bonding is to coat the mold surface with a release agent. Illustrative of such thermoplastics include polystyrene polyvinylacetate, poly(methyl methacrylate), poly(vinyl butyral), poly(vinyl alkyl ethers) polysulfone, polycarbonates, and natural and synthetic rubbers.

The composites of this invention are laminates of the foil and a plastic which softens to a flowable condition at temperatures in the range of above about 20° C. to about 110° C. and which are solid and non-flowable at temperatures of about 20° C. Polymer softening properties outside of this range are essentially unsuitable for the hobbyist applications for which the composites of this invention can be employed. High molecular weight polycaprolactone is particularly suitable for the practice of the invention. It has a crystalline melting temperature ($T_m$) of about 60° C. and has very desirable flow properties when softened. Based on an analogy with the flow properties of high molecular weight polycaprolactone, it is recommended that the polymer used in the practice of this invention as the support layer for the foil have a melt flow at 80° C. or at a higher temperature (but less than 100° C.), in gram/10 minutes, determined according to ASTM D 1238, at 43.25 psi, of at least 0.25, preferably at least 0.75, and most preferably, at least 1.25, and typically not greater than 3.0. An optimum melt flow is in the range of about 1.75 to about 2.5.

The relationship of the foil to the plastic support layer is not narrowly critical. However, in the shaping process, one is inclined to extend the composite to conform it to the shape of the molding surface. In doing this, it is desirable to have sufficient of the support plastic available to accommodate the degree of extension of the composite without significantly extending the foil layer. This does not mean that the foil layer will not extend with the plastic layer. It has been found that the foil layer will extend and flow in the shaping step with the plastic, though the flow characteristics of the foil need not be the same as the plastic support. However, since the foil is typically decorated with an ink coating or other type of coating to effect a particular decoration, and such are frequently adversely effected by extension of the foil, it is desirable to minimize the foil's extension. Thus, a practical relationship is that the thickness of the foil should be less than that of the plastic support layer. In the typical case, the foil's thickness, based on a single foil layer, should be not greater than about one-half (½) that of the plastic support layer, based on a single plastic support layer.

In a preferred embodiment of the invention, handcrafting of the composite involves substantial extension of the foil and the plastic support layer to create an unique mottled appearing surface. Exceptional aesthetic effects can be achieved by such a procedure. In such a case, the foil layer is caused, by thorough working of the composite while the plastic support layer is in a heat softened condition, to flow into the plastic layer, and vice versa, and a non-laminar composite is formed.

The composite of the invention can be formed by hand or by machine. Its manufacture is quite simple. The simplest method employs a layer of the plastic which can be formed by heating pellets of the plastic in hot water above its softening temperature, e.g., from above about 60° C. to about 100° C. in the case of high molecular weight polycaprolactone, and when the pellets are suitably softened and tacky to themselves, the plastic is worked by hand into a transparent sheet of any desired thickness. While it is still in a softened state, and repeatedly maintained that way by reimmersion into the hot water, a layer of foil can be pressed into the plastic layer, and the mass can be cooled. If the plastic is sufficiently warm at the pressing of the foil to the plastic, then the foil should adequately adhere to the plastic for many applications. However, if the foil refuses to adequately bond to the plastic layer, then an adhesive bonding aid should be employed. Many conventional adhesives can be employed for this purpose. Commercially available polyvinylacetate, nitrocellulose, rubber based and nitrile type adhesives may be used to insure adequate adhesion. However, when adhesives are employed, then it is not necessary to heat soften the plastic to effect adhesion but in the preferred practice of the invention, the plastic is heat softened in the range of about 70° C. (about 158° F.) to about 163° C. (325° F.) to assure maximum film to film contact for maximum adhesion. Compression at the point of lamination of the films is that minimum amount by which the films can be effectively adhesively bonded.

The composite structure may comprise more than a single layer of the foil and the plastic support. The composite may be a laminate of two layers of the foil and one layer of the plastic support or three layers of the foil separated from each other by two layers of the plastic support. Any combination of the foil layer and plastic support layer is encompassed by the invention so long as at least one layer of the foil comprises an outer layer of the composite laminate.

Machine production of the composite can be effected with commercially available equipment. There are two general types of equipment available for pressing foil to a surface. One is a pad type press and the other is the roll on foil type press. The former is used in batch operations and is most predominant in the industry. The latter is used in continuous and semi-continuous operations. Both types of operations can be used in the practice of the invention. It is preferred in the practice of the invention to use the roll on foil type press. Illustrations of that type of equipment can be found in Alexander, U.S. Pat. No. 3,654,016, supra, especially at column 3, lines 38-56.

The foils used in the practice of the invention are commercially available products. They are currently available from, inter alia, Transfer Print Foils, Inc., East Brunswick, N.J.

Crown Roll Leaf Inc., Patterson, N.J.

Dri-Print Foils Inc., Rahway, N.J.

Such foils are made by processes well known in the art. In this regard, reference is made to Scharf, U.S. Pat. No. 3,235,395, supra. They are typically made by providing a plastic carrier layer frequently made of polyethyleneterephthalate, onto which is provided a release coating and then a protective layer for the total foil structure. After such is done, the surface of the protective layer may (optionally) then be coated with a fine metal film which may be aluminum, chromium, gold, silver, magnesium, titanium, copper, nickel or any other metal. Coating of the metal film may be effected by techniques well known in the art, such as by thermal vapor deposition or cathode sputtering. As a rule, the thickness of the film is extremely small, usually not exceeding about 1 mil (0.00254 cm.), more generally less than about 0.1 mil (0.000254 cm.), and characterized frequently as less than 0.02 mils (0.0000508 cm.) and on some occasions, as thin as 0.001 mils ($2.5 \times 10^{-6}$ cm.). As an option, there may be placed on top of the metal film an adhesive coating for bonding the foil to the plastic support layer to make the composite of the invention.

The protective layer may be an ink coating providing the desired coloration or design for the metal film when such are employed. The ink can be made from a wide variety of resin systems widely employed in the art. The resins may be derived from an acrylic resin, a polyvinyl chloride based resin, nitrocellulose lacquers, and the like. The protective layer can be a combination of a transparent coating onto which is provided the colorant coating. In most instances, the desired styling effect for the foil will result from the kind of protective layer is provided to the foil structure. In many instances, a metal film will not be employed in the foil's manufacture. When that is the case, the protective coating is provided with metallic fillers to generate a metallic finish or pearlescent fillers (e.g., titanate coated micah blended with a colorant) to generate a pearlescent appearance to the foil. The use of metal or pearlescent fillers are not required in the absence of the metal film to yield a foil material suitable for the practice of the invention. In the preferred practice of the invention, a metal film or a pearlescent coating is used in the foils of the invention.

The release coating or layer used in the foil, such that the carrier is not bonded to the protective layer, is a coating material which does not adhere to either the carrier or the protective coating in making the foil structure. Many release coatings are recommended in the art and many are commercially available materials. Acrylic coatings, polyurethanes, silicone resins, phenolic resins, polyvinyl acetate based materials, are useable for such applications. The choice of the release coating is dependent on the type of solvents employed in the protective coating. It is not desirable to employ a release coating that is dissolved by the solvents used in forming the protective coating.

The adhesive, when employed to bond the foil to the plastic support, may be any of those recommended in the art for this purpose. Owing to the compatibility of high molecular weight polycaprolactone to the following materials, any one of them may be used as the base resin in making the adhesive: poly(vinyl chloride), Phenoxy (a poly(hydroxy ether) prepared from bisphenol A and epichlorohydrin), nitrocellulose, polyepichlorohydrin, and chlorinated polyether (Penton ™). Many of the rubber based adhesives are most effective for securing the foil to the plastic support.

The preferred foil is made to contain an aluminum film and the protective coating for the film is provided with colorant.

The following illustrates a preferred method for making the composite by the machine method: A continuous strip of high molecular weight polycaprolactone is formed in a 2.5 inches (6.35 cm.) single screw Prodex ™ extruder. A desirable formulation comprises 100 pounds (45.36 kg) of high molecular weight polycaprolactone (high molecular weight polycaprolactone-700 from Union Carbide Corporation) pellets, 1 pound (0.4536 kg) of N,N'-dioleoylethylenediamine, and about 0.705 av.oz. (20 grams) to about 2 pounds (0.9072 kg) of colorant (pigments) depending on the nature of the colorant. This formulation is stirred in a container until relatively homogeneous. The container's contents are incrementally fed to the 2.5 inches (6.35 cm.) single screw Prodex ™ extruder operated at about 150° C. to form continuous ribbons 1.5 inches (3.81 cm.)×1/16th inch (0.159 cm.) in dimension. The continuous ribbon is fed in combination with a continuous strip of foil that contains an outer layer of adhesive facing the ribbon. The foil strip is 2 inches (5.08 cm.) wide by 1/32 inch (0.08 cm.). The ribbon and strip are joined by compression on a Franklin Manufacturing Corporation (Norwood, Mass.) roll on foil press between soft silicone rubber coated roll while heating the composite at 93° C. (200° F.).

The resulting composite may be heated in water at a temperature of from above about 60° C. to below about 100° C., sufficient to soften the plastic layer and the softened composite can be molded in a steel die to replicate the shape and details of the die, whether a male or female die. When the composite is cooled below about 60°, the composite is readily separable from the mold without leaving a deposit of the plastic in the mold. The molded foil-plastic composite is rigid and tough.

I claim:

1. A heat shapeable and deformable composite comprising (i) a thermoplastic layer of a high molecular weight poly(epsilon caprolactone) which softens to a flowable condition at temperatures in the range of above about 20° C. to about 110° C. and which is solid and non-flowable at a temperature of about 20° C., adhesively bonded to (ii) a foil layer comprising a thin layer of metal therein having a thickness less than about 0.000254 cm. and the foil layer has a thickness less than that of (i).

2. The composite of claim 1 wherein the foil contains a pearlescent coating.

3. The composite of claim 1 wherein the metal is aluminum.

4. The composite of claim 1 wherein the foil contains a protective coating.

5. A process of making a heat shapeable and deformable composite which comprises heat compressing (i) a thermoplastic layer of a high molecular weight poly(epsilon-caprolactone) which softens to a flowable condition at temperatures in the range of above about 20° C. to about 110° C. and which is solid and non-flowable at a temperature of about 20° C., to (ii) a foil layer comprising a thin layer of metal therein having a thickness less than about 0.000254 cm. and the foil layer has a thickness less than that of (i) such that (i) is adhesively bonded to (ii).

6. The process of claim 5 wherein the foil contains a pearlescent coating.

7. The process of claim 5 wherein the metal is aluminum.

8. The process of claim 5 wherein the foil contains a protective coating.

9. The process of handcrafting a metal foil laminate composite which comprises subjecting a composite comprising (i) a thermoplastic layer of a high molecular weight poly(epsilon-caprolactone) which softens to a flowable condition at temperatures in the range of above about 20° C. to about 110° C. and which is solid and non-flowable at a temperature of about 20° C., adhesively bonded to (ii) a foil layer comprising a thin layer of metal therein having a thickness less than about 0.000254 cm. and the foil layer has a thickness less than that of (i), to a temperature above the softening temperature of the thermoplastic layer and softening the thermoplastic layer, removing the heated composite from the application of heat such that its temperature is caused to decrease, shaping the composite while the thermoplastic layer is still soft, and cooling the composite to a temperature below the thermoplastic's softening temperature.

10. The process of claim 9 wherein the foil contains a pearlescent coating.

11. The process of claim 9 wherein the metal is aluminum.

12. The process of claim 9 wherein the foil contains a protective coating.

* * * * *